US009691295B2

(12) United States Patent
Räsänen (10) Patent No.: US 9,691,295 B2
(45) Date of Patent: Jun. 27, 2017

(54) MUSICAL PUZZLE (71) Applicant: Mubik Entertainment Ltd., Espoo (FI)

(72) Inventor: Ilkka Räsänen, Espoo (FI)

(73) Assignee: Mubik Entertainment Ltd., Espoo (FI)

( * ) Notice: Subject to any disclaimer, the term of this patent is extended or adjusted under 35 U.S.C. 154(b) by 77 days.

(21) Appl. No.: 13/971,787

(22) Filed: Aug. 20, 2013

(65) Prior Publication Data

US 2014/0051512 A1 Feb. 20, 2014

Related U.S. Application Data (60) Provisional application No. 61/691,224, filed on Aug. 20, 2012.

(51) Int. Cl.
| | |
|---|---|
| A63F 9/24 | (2006.01) |
| G09B 15/02 | (2006.01) |
| A63F 13/00 | (2014.01) |
| G09B 15/00 | (2006.01) |
| A63F 13/814 | (2014.01) |
| A63F 13/2145 | (2014.01) |
| A63F 13/285 | (2014.01) |
| A63F 13/46 | (2014.01) |

(52) U.S. Cl.
CPC .......... G09B 15/023 (2013.01); A63F 13/005 (2013.01); A63F 13/2145 (2014.09); A63F 13/814 (2014.09); G09B 15/00 (2013.01); *A63F 13/285* (2014.09); *A63F 13/46* (2014.09)

(58) Field of Classification Search
CPC .... A63F 13/00; A63F 13/814; A63F 13/2145; A63F 13/005; G09B 15/023; G09B 15/00
See application file for complete search history.

(56) References Cited

U.S. PATENT DOCUMENTS

| | | | |
|---|---|---|---|
| 2003/0100965 A1* | 5/2003 | Sitrick ................. | G09B 15/023 700/83 |
| 2005/0005761 A1* | 1/2005 | Knudsen ......................... | 84/645 |
| 2007/0213111 A1* | 9/2007 | MacIver et al. .................. | 463/9 |
| 2008/0280680 A1 | 11/2008 | Dutilly et al. | |
| 2009/0288545 A1* | 11/2009 | Mann ..................... | G09B 15/00 84/484 |
| 2009/0312102 A1 | 12/2009 | Oberg et al. | |
| 2010/0035685 A1* | 2/2010 | Cha ................................. | 463/35 |
| 2010/0188340 A1* | 7/2010 | Smoot ..................... | G06F 3/011 345/173 |
| 2010/0287471 A1* | 11/2010 | Nam ............................. | 715/702 |
| 2010/0288108 A1 | 11/2010 | Jung et al. | |

(Continued)

FOREIGN PATENT DOCUMENTS

WO 2014029902 A1 2/2014

Primary Examiner — Dmitry Suhol
Assistant Examiner — Carl V Larsen
(74) Attorney, Agent, or Firm — Haynes Beffel & Wolfeld LLP

(57) ABSTRACT

This application discloses a game that engages a user in correctly reproducing the duration of notes (short, long) to reproduce a melody from a sequence of notes. The melody becomes recognizable when the durations are approximately correct. As a game, the processing system may score the selected durations and provide feedback to the gamer.

This technology can be implemented as a method, device, system or article of manufacture. In addition, for some jurisdictions, it can be described as software that produces a technical effect.

19 Claims, 6 Drawing Sheets (56) References Cited

U.S. PATENT DOCUMENTS

2010/0308982 A1* 12/2010 Cooperstock ........... G06F 3/011
340/407.1
2013/0157761 A1* 6/2013 Cichowlas ..................... 463/31

* cited by examiner

FIG. 2a) Pattern with circular route

FIG. 2b) Matrix Pattern with shuffled route

FIG. 2c) Rounded Pattern with circular route

FIG. 2d) Free Form Pattern with continuous route

FIG. 4a) Tile coding scheme based on colors and fill patterns

FIG. 4b) Tile coding scheme based on characters and glyphs

FIG. 4c) Tile coding scheme based on graphical symbols

FIG. 4d) Combination of different tile coding schemes

Random Route 3

Random Route 4

MUSICAL PUZZLE

RELATED APPLICATION

This application is related to and claims the benefit of U.S. Provisional Application No. 61/691,224 filed on Aug. 20, 2012, entitled "Musical Puzzle" naming inventor Ilkka Räsänen. The related provisional application is hereby incorporated by reference.

TECHNICAL FIELD

This application discloses a game that engages a user in correctly reproducing the duration of notes (short, long) to reproduce a melody from a sequence of notes. This technology can be implemented as a method, device, system or article of manufacture. In addition, for some jurisdictions, it can be described as software that produces a technical effect.

BACKGROUND ART

There are a variety of music-oriented games, such as Guitar Hero, that challenge a user to hit notes following a pattern displayed. Similarly, there are teaching programs that show what notes a user should play or what keys a user should press. Some of these games and programs use simulated instruments and others use computer displays or touch screens.

DETAILED DESCRIPTION

The technology disclosed engages a user to reproduce a melody from a sequence of notes by selecting durations for notes. The melody becomes recognizable, when the durations are approximately correct. As a game, the processing system may score the selected durations and provide feedback to the gamer.

In one implementation, successive notes are displayed on a touch sensitive screen, e.g. of a tablet. For instance, they may be adjoining tiles of a matrix. The display hints at or indicates the notes using tiles coded with varying coding schemes, such as colors, to indicate higher and lower pitches. The user moves a finger, stylus or other actuator along a specified path, lingering longer over notes with a longer duration and passing more quickly over notes with a shorter duration. For instance, a finger might stay with a tile that should be reproduced as a whole note four times as long as a tile that should be reproduced as a quarter notes. In some implementations, the duration may be quantized to any note fraction, such as an eighth or quarter note. When the viewing surface is a display, rather than a touch screen, a stylus or other actuator is used to "touch" the tiles on the display.

Figure 1:
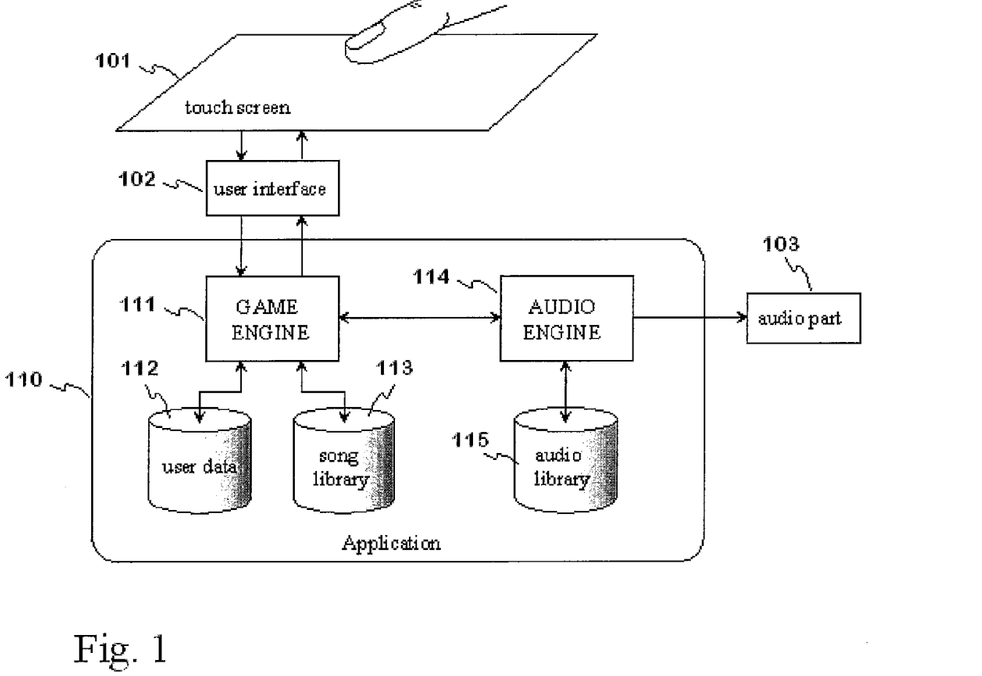
FIG. 1 presents an overview of one implementation of a system presenting the inventions and implementing methods of playing the musical puzzle game.

FIG. 1 presents a simplified block diagram of an example system. The system includes a physical device with system software and an application according to the technology disclosed. The block diagram illustrates a touch screen 101, user interface 102 based on it and an audio part 103. The application 110 includes a game engine 111, user data 112 and song library 113. The game engine 111 evaluates user song recognition, implements game rules and manages game state and play. The game engine interacts with a user through the user interface and touch screen and it uses the user data and song library. The user data 112 stores player properties, high scores and different game parameters. The song library 113 contains melodies of a plurality of songs or pieces, which can be played with the system. In addition, the application 110 includes an audio engine 114, controlled by the game engine, and an audio library 115. The audio engine implements the sound synthesis and outputs signals to the audio part or port 103 of the device. The audio engine also implements the audio playback function. The audio library 115 contains e.g. sound effects related to different instruments, which effects the audio engine can use in the synthesis. Naturally, the application 110 is located in the memory of said device.

A tablet, Smartphone or other display can be arranged as a continuous path around the perimeter of a tablet area, making the path endless that is easily followed without lifting a finger. In some implementations, the next few tiles may become emphasized to guide the user's finger. Following the emphasized path, a user can play the game by sliding a finger from one tile to the next. The difficulty associated with using multiple fingers to select keys or controls in various positions is alleviated by a control sequence that can be operated with a continuous sliding touch. In some implementations, a rest (pause) can be given a duration by lifting the finger. In others, reversing the direction of the slide or moving out of the direct path between adjoining tiles can signal a rest.

The game play is more fully illustrated in the accompanying drawings presentation, with some variations in patterns, tiles and routes used in game play. For instance, game play can be made more challenging by various new games modes, e.g. shuffling the tiles so that previously predefined path is unknown. Once the user knows the title of a song, he/she can try to re-play the beginning of the song to a certain point based on e.g., trial and error. This is shown by several figures in the accompanying drawings.

Figure 2:
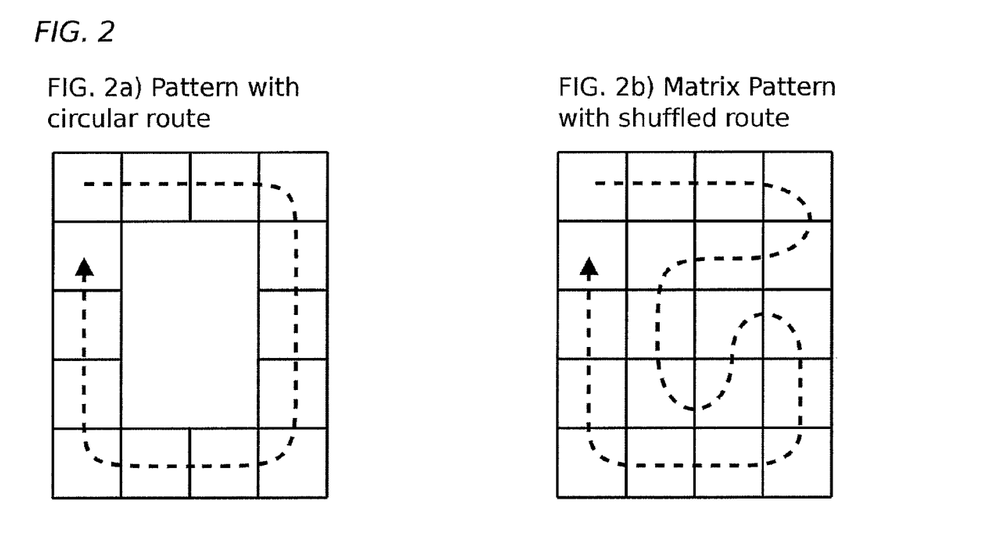
FIG. 2 illustrates different patterns that can be set up on a play area using tiles as playing pieces in musical puzzle game.
Figure 2C:
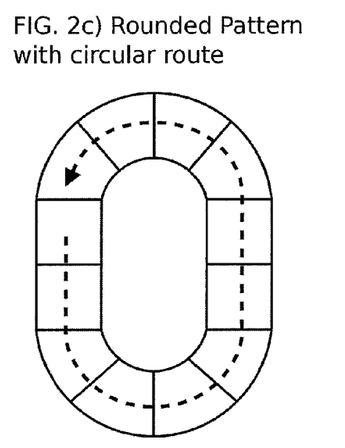
Figure 2D:
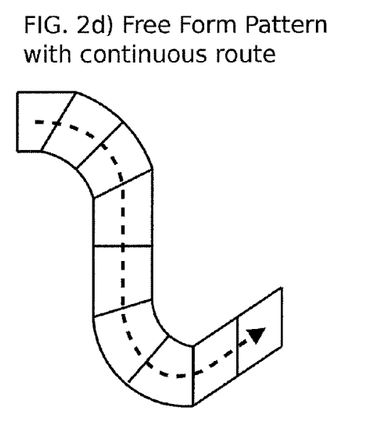

FIG. 2 shows examples of patterns that can be of matrix form or other rounded or circular patterns depending on the geometric configuration of tiles being used. The system can further include the route forming a closed loop within a pattern as FIG. 2a and FIG. 2c exhibits. Alternatively the route can be setup to follow random path between adjoined tiles and route being unknown to user after setting the content of the pattern as illustrated in FIG. 2b. The route can also be other free form pattern with continuous path as shown in FIG. 2d.

Figure 3:
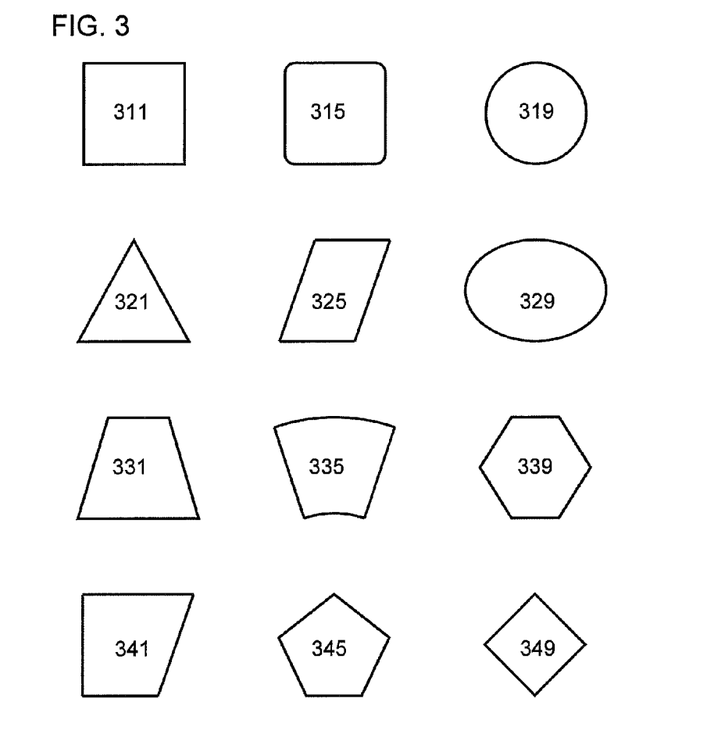
FIG. 3 illustrates examples of different geometric configurations that can be used on a computer display or a touch screen to visualize tiles.

FIG. 3 shows examples of different geometric configurations that can be rendered on a computer display or touch screen to present tiles. Tiles of varying shapes and sizes may be used including square 311, square with rounded corners 315, circle 319, triangle 321, parallelogram 325, ellipse 329, trapezoid 331, circular trapezoid 335, hexagon 339, polygon 341, pentagram 345, diamond 349 and other geometric shapes.

Figures 4, 4A, 4B, 4C, 4D:
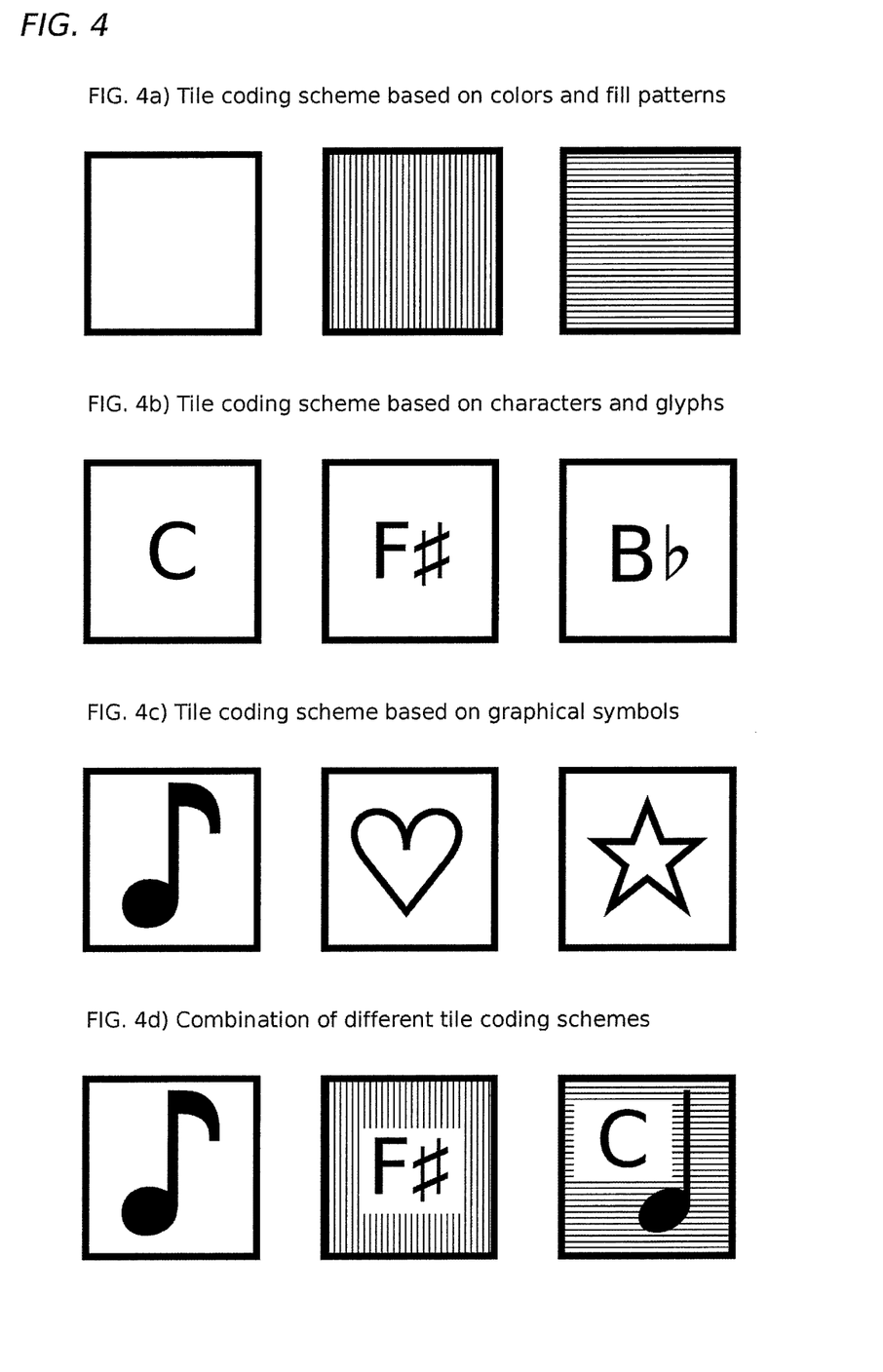
FIG. 4 illustrates different coding schemes that can be used to indicate the musical information attached to tiles.

FIG. 4 presents different coding schemes that can be used to indicate the musical information (pitch or pitches of notes) attached to tiles. The coding scheme used to attach said musical information to tiles can be based on different colors or fill patterns (FIG. 4*a*), characters and glyphs (FIG. 4*b*), different graphical symbols and images that can be rendered on computer display or touch screen (FIG. 4*c*) or a combination of coding schemes at the same time (FIG. 4*d*). In one implementation, different shapes and colors of tiles also can be combined to indicate the musical information. Generally, any combination of colors, glyphs and other graphical symbols and images can be used to visualize the musical information provided with a tile.

The game play disclosed produces the technical effect of audibly reproducing a melody that becomes recognizable a user selects an approximately correct duration for successive notes, optionally including rests (pauses) between notes. The user's attention is focused on note duration by controls that reproduce a specified sequence of notes and leave it to the user to progress through the notes with user-selected durations that reveal the corresponding melody.

Figure 5:
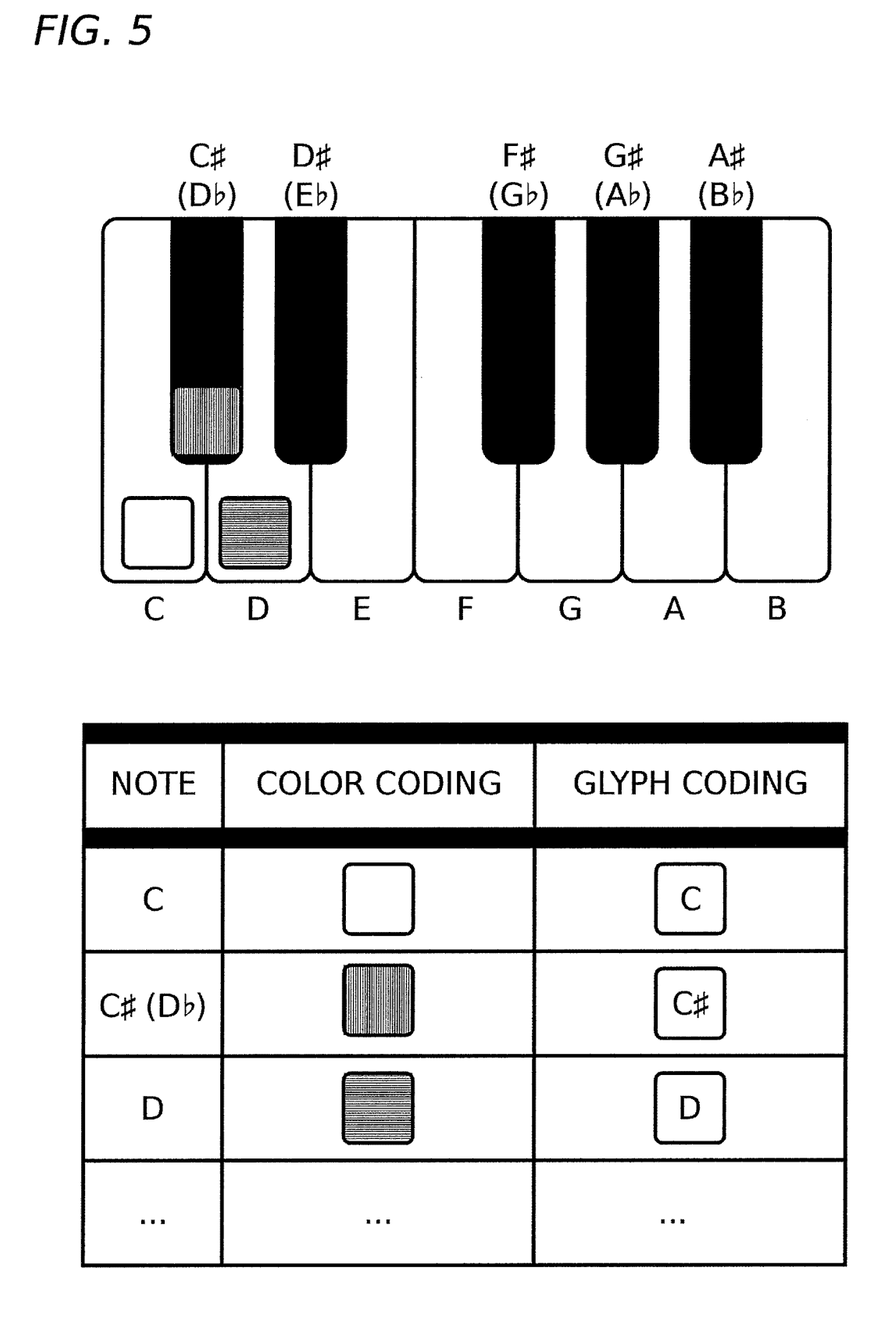
FIG. 5 shows examples how color based coding scheme could correspond to different musical notes.

FIG. 5 shows by example how musical note "C" could be coded using color 1 (e.g. white), musical note "C#" (C sharp) using color 2 (e.g. yellow), musical note "D" using color 3 (e.g. orange) and so one. Figure demonstrates an example of mapping between color coded tiles and different notes on a piano keyboard. As an example alternative glyph based coding scheme is also presented.

In some implementations, particular problems of musical game play are solved. The problem of engaging a user with the rhythm of a melody and providing feedback on whether the rhythm is matched by the user's performance can be solved by providing a path of adjoining tiles coded to indicate pitches, notes, frequencies or chords of a melody. Responsive to this display, receiving successive user selections of the adjoining tiles with respective durations, scoring whether the respective durations match the melody, and providing feedback.

Wrapping the adjoining tiles around a continuous path can enhance this solution, so that tiles that have been selected can be replaced by new tiles. The solution also can be enhanced by using a touch screen with adjoining tiles that can be selected with continuous touch on the touch screen.

Figure 7A:
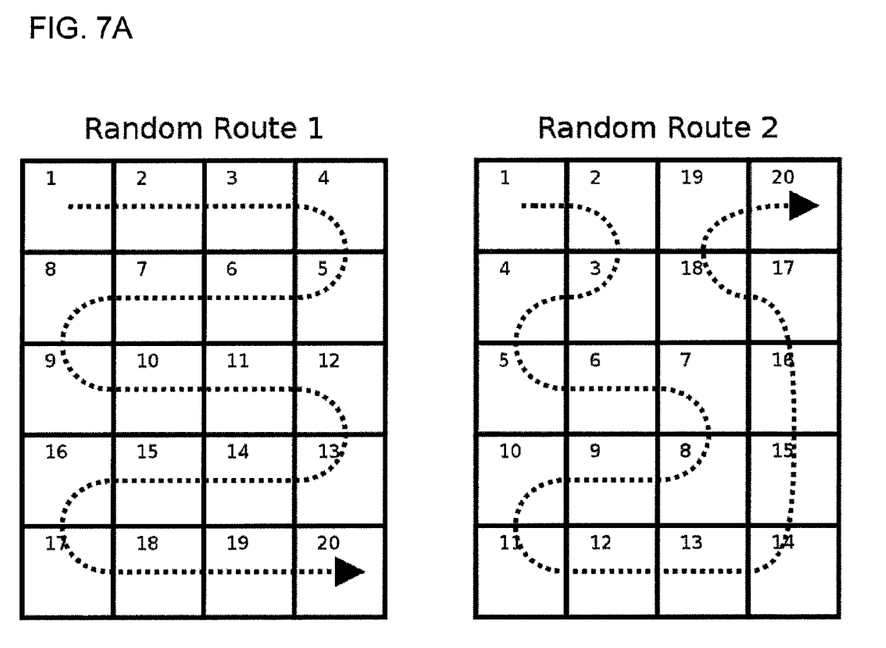
FIGS. 7A-B show examples of different routes within matrix pattern.
Figure 7B:
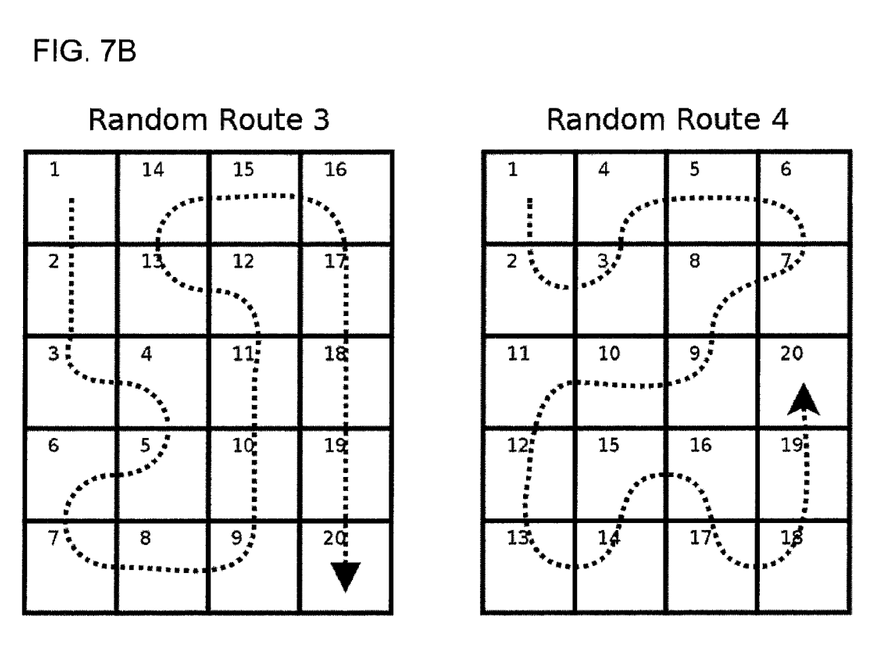

FIGS. 7A-B show examples of different alternative ways of setting up a random route between adjoining tiles in a matrix like pattern. The route being unknown to user after setting the content of the matrix and the musical piece to be played in which case the route producing the musical piece is to be solved by exploring different alternative paths within the matrix.

Figure 6:
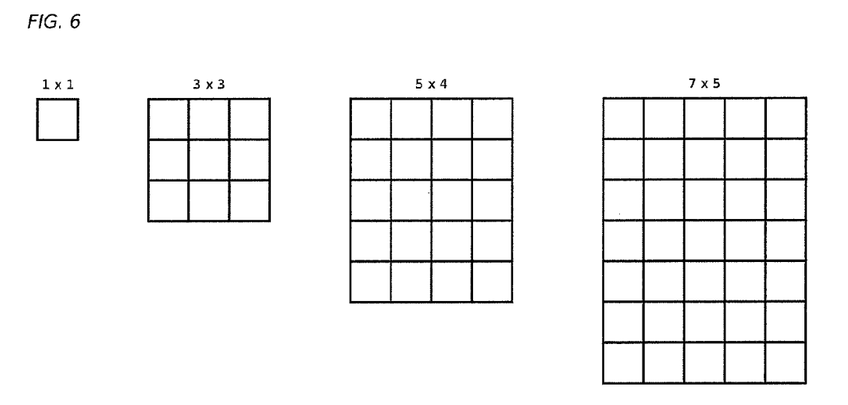
FIG. 6 illustrates how matrix patterns with various numbers of rows and columns could be used to organize the tiles used in musical puzzle game.

Adjusting the size of the adjoining tiles and size of the pattern to physical size and dimensions of the computer display or touch screen available on same table, smart phone or similar devices can enhance the game play. FIG. 6 shows examples of matrix like patterns with varying numbers of rows and columns that could be used to display tiles in a musical puzzle game. The actual dimensions of a pattern can adapt to a physical size and dimensions of a computer display or a touch screen available on some tablet, smart phone or similar device and user size preferences.

The game play disclosed can be implemented as a method. On a touch screen tablet, smart phone or similar device, a combination of hardware, software and firmware can produce a device or system that practices the method. On many tablets, smart phones and similar devices, a user interface program can be stored on a computer device readable memory, such that combining the interface program with the tablet or similar device enables the device to practice or the method or to produce a system that practices the method.

Particular Implementations

In one implementation, a system is described for playing musical pieces that includes an audio part (such as a signal processor or synthesizer), a touch screen and user interface based on it and a control part with a memory and an application. The melody of a plurality of musical pieces is in the memory during use of the system. The application is arranged, configured or adapted to produce on the screen a pattern of adjoining tiles with varying coding schemes. The tiles belong to a coded set of tiles (symbol set) and correspond to a defined frequency in a coding scheme being used. The application is arranged control the audio part to generate a sound with at least one defined frequency when a tile in the pattern is touched. The application is arranged to place tiles in the pattern so that variation in the frequency follows the melody of a particular musical piece when a touch of the tiles is moved along a defined route in the pattern. The application is arranged to change content of the pattern responsive to a user control so that new content corresponds to a new musical piece.

This system and other implementations of the technology disclosed can each optionally include one or more of the following features and/or features described in connection with additional systems disclosed. In the interest of conciseness, the combinations of features disclosed in this application are not individually enumerated and are not repeated with each base set of features. The reader will understand how features identified in this section can readily be combined with other sets of base features identified as implementations.

The system can further include the musical piece being played while being hidden after setting the content of the pattern, and the route being known, in which case the musical piece is to be recognized if the touch is moved along said route with touch rates that match durations of notes in the melody. It can include the pattern being a matrix, the route being unknown after setting the content of the matrix and the musical piece to be played is shown, in which case the route producing this musical piece is to be solved by exploring.

The system can also be further arranged to evaluate whether durations of user touches at the tiles approximately match the musical piece to be recognized and to provide feedback to the user about his/her performance by showing the evaluating result, or score. By approximately, we mean having a similar duration. Differences in duration can produce better scores (similar durations) and worse scores (different durations). Differences can be calculated as ratios, such as a half note vs. a quarter note is 2:1. Close may be +/−10 or 20 or 50 percent. Close may vary through the musical piece, taking into account any variation in tempo as a user plays faster or slower. Differences also may be calculated in increments of time, such as a quarter note being 0.25 seconds and close being +/−0.10 or 0.15 or 0.20 seconds, regardless of the length of note. The parameters chosen for closeness may vary by a selected expertise level.

The system can further include the route forming a closed loop, and the application being further arranged to replace the tiles already touched, from a starting point of the loop, with new tiles during the touch being moved along the route so that the musical piece in question proceeds without discontinuity when passing the starting point in a second or subsequent loop.

The system can further include each tile in the pattern being provided with a code, which indicates a pitch of the musical piece in question. It can include the adjoining tiles being arranged on the touch screen to allow a continuous sliding touch of the touch screen.

In another implementation, a method is described for playing musical pieces. In this method, melodies of a plurality of musical pieces are stored in a memory. The method includes producing on a touch screen a pattern of adjoining tiles. The tiles are coded using selected coding scheme to form the symbol that correspond to a defined frequency or frequencies. The symbols belong to a symbol set and correspond to defined frequencies in a musical piece. The method further includes controlling an audio part (e.g., signal processor or synthesizer) to generate a sound with at least one defined frequency when a tile in the pattern is touched. It includes placing coded tiles in the pattern so that variation in the frequency follows melody of a musical piece, when a touch on the screen is moved along a defined route in the pattern. It includes changing content of the pattern responsive to a user control so that new content corresponds to a new musical piece.

This method and other implementations of the technology disclosed can each optionally include one or more additional features described here or above.

The method can include the musical piece being played hidden after setting the content of the pattern, and the route is known, in which case the musical piece is recognized if the touch is moved along said route.

The method can further include the pattern being a matrix, the route being unknown after setting the content of the matrix and the musical piece to be played, in which case the route producing this musical piece is to be solved by exploring. It can also include evaluating whether durations of user touches at the tiles match the musical piece to be recognized and providing feedback to the user about his/her performance by showing the evaluating result, or score.

The method can also include the route forming a closed loop, and further replacing the tiles, from a starting point of the loop, with new tiles as the touch is moved along the route so that the musical piece in question proceeds without discontinuity when passing the starting point on second and subsequent loops. It can further include the adjoining tiles being arranged on the touch screen to allow a continuous sliding touch of the touch screen.

Other implementations may include a non-transitory computer readable storage medium storing instructions executable by a processor to perform a method as described above. Yet another implementation may include a system including memory and one or more processors operable to execute instructions, stored in the memory, to perform a method as described above.

In another implementation, a system is described that engages a user with a rhythm of a musical piece and provides feedback on whether a user's performance approximately matches the rhythm. The system further comprises an audio output, and a processor that controls the touch display and the audio output. The processor executes instructions arranged to provide a path of adjoining tiles, to be displayed with coding to indicate pitches, notes, chords or frequencies of the musical piece. The instructions are further arranged to play the pitches of the musical piece as a user selects the adjoining tiles with respective durations of selection. The instructions are further arranged to score whether the respective durations match the musical piece and provide feedback to the user.

This system and other implementations of the technology disclosed can each optionally include one or more additional features described.

The system can further include instructions that are arranged to display the adjoining tiles on the touch screen in a continuous path and to replace tiles that have been selected with new tiles as the musical piece proceeds. It can also include the adjoining tiles being arranged on the touch screen to allow section with a continuous sliding touch of the touch screen.

In another implementation, a method is described that includes engaging a user with a rhythm of a musical piece and providing feedback on whether a user's performance approximately matches the rhythm. The method further includes executing instructions on a processor, providing a path of adjoining tiles, to be displayed with coding to indicate pitches, notes, chords or frequencies of the musical piece, playing the pitches of the musical piece as a user selects the adjoining tiles with respective durations of selection, scoring whether the respective durations match the musical piece, and providing feedback to the user.

This implementations of the technology disclosed can each optionally include any of the more additional features described above or in the following paragraph.

The method can further include providing a display of the adjoining tiles on the touch screen in a continuous path and replacing tiles that have been selected with new tiles as the musical piece proceeds. It can further include the adjoining tiles being arranged on the touch screen to allow section with a continuous sliding touch of the touch screen.

The method can further include a quiz mode allowing user to prove that user has recognized the musical piece in question and providing feedback to the user based on the evidence user has given. The user can prove recognition by supplying words, typed or spoken, that recognize the composer or title of the piece. The user also can prove recognition by playing the piece using a keyboard on screen or to a microphone connected to the audio part, for the audio part to recognize.

Other implementations may include a non-transitory computer readable storage medium storing instructions executable by a processor to constitute a system and methodically perform it as described above. Yet another implementation may include methods that the system above and its features implement.

The invention claimed is:

1. A system for playing musical pieces, comprising:
an audio part, a touch screen of a computer device and user interface based on the touch screen and a control part with a memory and an application, wherein the computer device is a tablet or a smart phone;
wherein melodies of a plurality of musical pieces are in the memory during use of the system and said application is arranged to:
produce on the touch screen a pattern of tiles, the tiles in the pattern being provided with codes that correspond to a sound with at least one defined frequency;
control the audio part to generate said sound when a tile is touched;
place tiles in the pattern so that variation in said sound follows the melody of a particular musical piece, when a touch of the tiles is moved along a defined route of adjoining tiles in the pattern, playing speed depending only on progress of said touch; and change content of the pattern responsive to a user control so that new content corresponds to a new musical piece.

2. The system according to claim 1, the musical piece to be played being hidden after setting the content of the pattern, and said route is known, in which case the musical piece is to be recognized as the touch moves along said known route.

3. The system according to claim 2, said application further being arranged to:
evaluate whether durations of user touches at the tiles match the musical piece to be recognized; and
provide feedback to the user about his/her performance by showing a result or score of the evaluating.

4. The system according to claim 2, wherein the user touches a tile using a finger, stylus or other actuator.

5. The system according to claim 2, wherein said route forms a closed loop, and said application is further arranged to replace some of the tiles that have been touched with new tiles, while the touch on the screen moves along the loop so that the musical piece in question continues when passing the starting point on second and subsequent loops.

6. The system according to claim 1, said pattern being a matrix, said route being unknown after setting the content of the matrix and the musical piece to be played is shown, in which case the route producing this musical piece is to be solved by exploring.

7. A method of playing musical pieces, wherein melody of a plurality of musical pieces has been stored in a memory, the method comprising:
producing a pattern of tiles on a touch screen of a computer device, the tiles in the pattern being provided with codes that correspond to a sound with at least one defined frequency, wherein the computer device is a tablet or a smart phone,
generating said sound when a tile is touched,
placing tiles in the pattern so that variation in said sound follows the melody of a musical piece, when tiles are touched along a defined route of adjoining tiles in the pattern, playing speed depending only on progress of said touch, and
changing content of the pattern responsive to a user control so that new content corresponds to a new musical piece.

8. The method according to claim 7, the musical piece to be played being hidden after setting the content of the pattern, and said route is known, in which case the musical piece is to be recognized as the user touches tiles along said known route.

9. The method according to claim 7, said pattern being a matrix, said route being unknown after setting the content of the matrix and the musical piece to be played is shown, in which case the route producing this musical piece is to be solved by exploring.

10. The method according to claim 8, further comprising:
evaluating whether durations of touching the tiles match the musical piece to be recognized; and
providing feedback to the user about his/her performance by showing a result or score of the evaluating.

11. The method according to claim 8, wherein said route has been formed as a closed loop, and the method further comprises replacing the tiles with new tiles as the user touches tiles along the route so that the musical piece in question continues when passing the starting point.

12. The method according to claim 7, wherein the adjoining tiles are arranged on the touch screen to allow continuous sliding touch along the tiles.

13. A system that engages a user with a rhythm of a musical piece and provides feedback on whether a user's performance matches the rhythm, comprising:
a touch screen of a computer device, wherein the computer device is a tablet or a smart phone,
an audio part, and
a processor that controls the touch screen and the audio part,
wherein the processor is arranged to execute instructions to:
provide a path of adjoining tiles on said touch screen, the tiles to be displayed with codes that indicate pitches, notes, chords or frequencies of the musical piece,
play the pitches of the musical piece as a user touches the adjoining tiles with respective durations of touches, playing speed depending only on progress of said touches,
evaluate whether the respective durations match the musical piece, and
provide feedback to the user.

14. The system according to claim 13, wherein instructions are further arranged to display the adjoining tiles on the touch screen in a closed loop and to replace tiles that have been selected with new tiles as the musical piece proceeds.

15. The system according to claim 13, wherein the adjoining tiles are arranged on the touch screen to allow selection with a continuous sliding touch of the touch screen.

16. A method that engages a user with a rhythm of a musical piece and provides feedback on whether a user's performance matches the rhythm, comprising:
executing instructions on a processor, providing a path of adjoining tiles on touch screen of a computer device, the tiles to be displayed with codes to indicate pitches, notes, chords or frequencies of the musical piece, wherein the computer device is a tablet or a smart phone,
playing the pitches of the musical piece as a user selects the adjoining tiles with respective durations of selection, playing speed depending only on progress of said selection,
evaluating whether the respective durations match the musical piece, and
providing feedback to the user.

17. The method according to claim 16, further including providing a display of the adjoining tiles on the touch screen in a closed loop and replacing tiles that have been selected with new tiles as the musical piece proceeds.

18. The method according to claim 16, wherein the adjoining tiles are arranged on the touch screen to allow selection with a continuous sliding touch of the touch screen.

19. The method according to claim 16, wherein the tiles can be rendered using varying geometric configurations.

* * * * *